No. 840,320. PATENTED JAN. 1, 1907.
N. G. HANNA.
SIDE DELIVERY BUNCHER.
APPLICATION FILED JUNE 2, 1902.
2 SHEETS—SHEET 1.
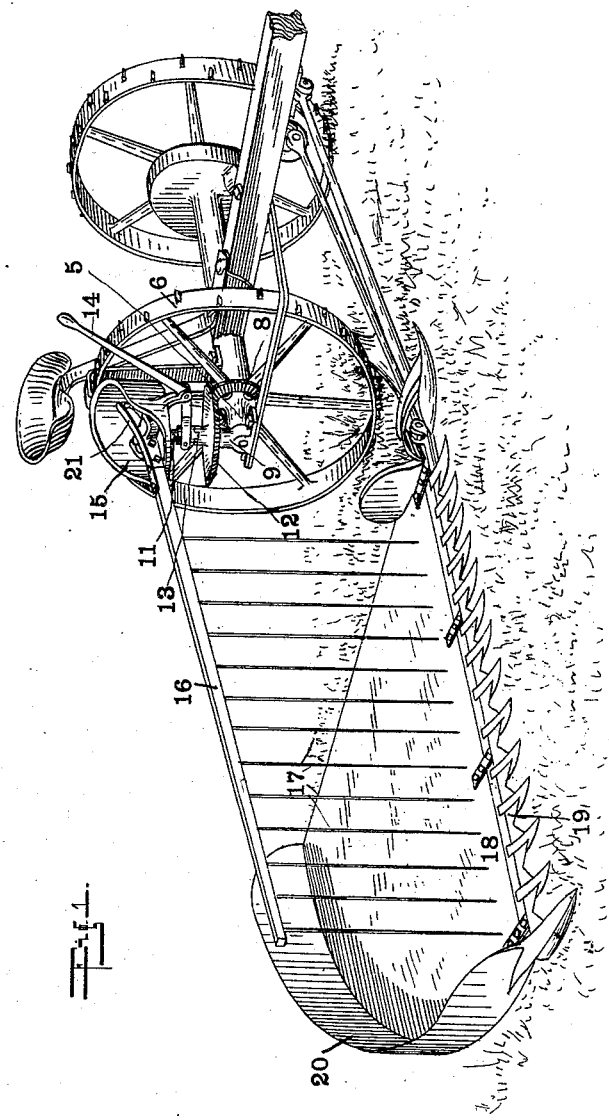
WITNESSES:
Chas. N. Leonard
J. A. Walsh
INVENTOR
Nelson G. Hanna
BY
Bradford & Hood
ATTORNEYS No. 840,320. PATENTED JAN. 1, 1907.
N. G. HANNA.
SIDE DELIVERY BUNCHER.
APPLICATION FILED JUNE 2, 1902.
2 SHEETS—SHEET 2.
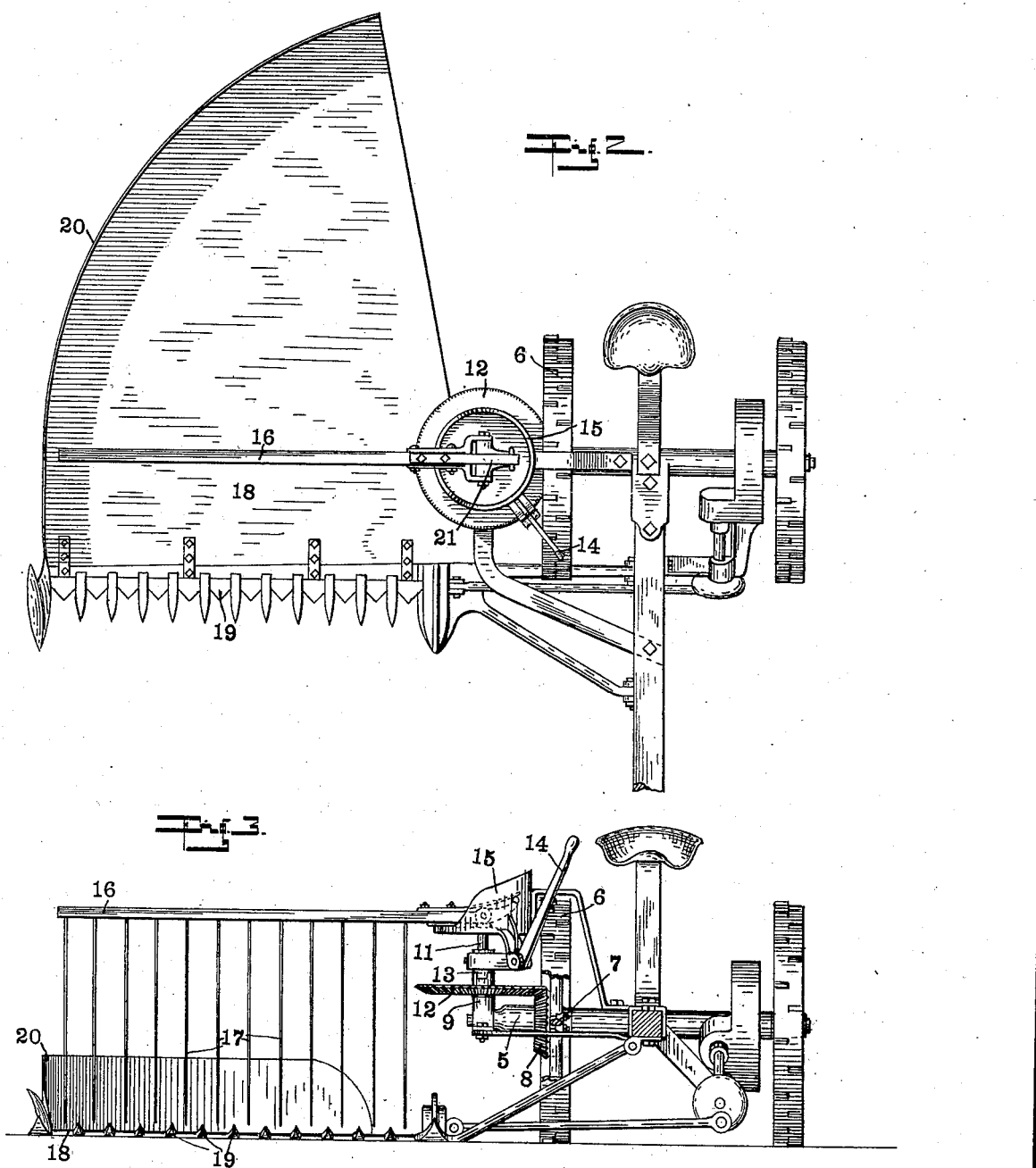
WITNESSES:
Chas. N. Leonard
J. A. Walsh
INVENTOR
Nelson G. Hanna
BY
Bradford Hood
ATTORNEYS

UNITED STATES PATENT OFFICE.

NELSON G. HANNA, OF CENTER TOWNSHIP, HOWARD COUNTY, INDIANA, ASSIGNOR OF THREE-EIGHTHS TO VIRGIL H. LOCKWOOD, OF INDIANAPOLIS, INDIANA.

SIDE-DELIVERY BUNCHER.

No. 840,320.   Specification of Letters Patent.   Patented Jan. 1, 1907.

Application filed June 2, 1902. Serial No. 109,848.

*To all whom it may concern:*

Be it known that I, NELSON G. HANNA, a citizen of the United States, residing in Center township, in the county of Howard and State of Indiana, have invented certain new and useful Improvements in Side-Delivery Bunchers, of which the following is a specification.

The object of my invention is to produce an attachment for mowing-machines for bunching clover, flax, peas, and the like.

It consists of two parts—a platform and a rake mechanism—which may be attached to an ordinary mowing-machine by which the cut crop may be bunched and then delivered to the rear of the main body of the machine instead of to the rear of the cutter-bar, thus leaving a clear path next to the standing crop for the passage of the mower during the next cut.

Another feature of my invention consists in means for continuously operating the rake and means for stopping and starting the operation of the rake, as desired.

The full nature of the invention will be understood from the accompanying drawings and the following description and claims.

Figure 1 is a perspective view of my device as attached to an ordinary type of mowing-machine. Fig. 2 is a plan view, and Fig. 3 is a front elevation.

In the drawings, 5 indicates a supplemental hub, which is clamped to the spokes of a transporting-wheel 6 of the machine by means of a suitable clamp, such as 7. The hub 5 carries a driving-wheel 8, and the outer end of said hub is reduced, so as to carry an upwardly-extending frame 9 thereon. The hub rotates with the wheel, and the reduced portion thereof rotates with the wheel, and the frame is held from rotation and in an upright position by braces or bars connected with the framework.

Stepped in the frame 9 is a vertical shaft 11, carrying a horizontal gear 12, which meshes with the gear 8. The gear 12 may be directly secured to the shaft 11; but I prefer to mount the said gear loosely upon the shaft and key upon said shaft a clutch 13, which may be thrown into or out of engagement with gear 12 by means of a suitable hand-lever 14. The upper end of the shaft 11 projects through a horizontal cam-plate 15, and pivoted upon the upper end of said shaft 11 upon an axis preferably at right angles to the axis of the shaft is a rake-bar 16, provided with suitable rake-teeth 17. The teeth 17 extend down close to a platform 18, which is secured to the rear edge of the cutter-bar 19, said platform 18 being preferably segmental in shape and provided on its curved side with a guard-wall 20. The cam-plate 15 is of such shape that as the rake-bar 16 is swung by the revolution of the shaft 11 the lower ends of the rake-teeth 17 will be maintained in close proximity to the platform until the rake-bar projects substantially to the rear, at which time the rake-bar will engage a rising portion of the cam-plate, which portion will serve to elevate the outer end of the rake-bar, and thus permit the passage of the rake-bar toward the front. The rake-bar may be held in engagement with the cam-plate by any suitable means, such as the spring 21.

In operation as the mowing-machine moves forward the cut crop falls upon the platform 20, and the shaft 11 is rotated, so as to move the rake-bar 16 from the front to the rear. The rake-teeth 17 engage the cut crop which bunches upon the platform and moves the same to the rear transversely, so as to discharge the bunch back of the main body of the machine. As soon as this occurs the rake-bar is brought into contact with the rising portion of the cam, the cam thus operating to elevate the outer end of the rake-bar into a nearly vertical position, so that the rake-teeth may pass over the adjacent driving-wheel 16. The movement of the rake-bar 16 may be continuous, if desired, but may be controlled by a proper movement of the hand-lever 14 and clutch 13.

What I claim as my invention, and desire to secure by Letters Patent, is—

1. The combination with a mowing-machine having a transporting-wheel, of a supplemental hub clamped to said wheel, a bevel-gear thereon, a frame for the rake mechanism journaled upon the hub and having a rigid connection with the frame of the machine, a rake, and means mounted in said frame for the rake mechanism for transmitting power from said bevel-gear to the rake.

2. The combination with a mowing-machine having a transporting-wheel, of a supplemental hub secured to the wheel, a frame mounted upon and extending above said hub, means connected with the frame of the machine to prevent the rotation of said frame, a rake, a bevel-gear on said supplemental hub, and means including a vertical shaft mounted in said frame that is driven by said bevel-gear for actuating the rake.

3. A rake mechanism for mowing-machines comprising a supplemental hub, means for securing said hub centrally to the side of a transporting-wheel of the machine to rotate therewith, a frame mounted on said hub, means for holding it from rotation with the hub, a rake, means mounted in said frame for operating the rake, and means on the hub for actuating said rake-operating means.

4. A rake mechanism for mowing-machines comprising a supplemental hub, means for securing said hub centrally to the side of a transporting-wheel of the machine to rotate therewith, a frame mounted on said hub, means for holding said frame from rotation and upright, a rake, means mounted in said frame for operating said rake, means on the hub for actuating said rake-operating means and a cam for elevating the rake during the operation thereof.

5. A buncher attachment for mowing-machines, consisting of a driving-gear, means for clamping said gear to a supporting-wheel of a mower, a frame, mounted beside the center of said wheel a shaft journaled in said frame, a gear journaled on said shaft and driven by the first-mentioned gear, a rake connected with the shaft, and a cam for elevating the rake substantially as and for the purpose set forth.

6. In a buncher, the combination with a platform to be secured in the rear of the cutter-bar of a mower, of a supplemental hub, means for attaching said hub to a transporting-wheel of a mower, a gear carried by said hub, a shaft, a frame mounted on said hub for supporting said shaft substantially vertically, a gear carried by said shaft and meshing with the first-mentioned gear, a rake pivotally connected with the upper end of such shaft, and a cam-plate arranged to engage the rake-bar, all substantially as and for the purpose set forth.

7. A rake mechanism for mowing-machines comprising a supplemental hub, means for securing said hub centrally to the side of a transporting-wheel to rotate therewith, a frame mounted on said hub, means for preventing the frame from rotating with the hub, a rake, a gear secured on said hub, and means mounted in said frame for transmitting power from the gear to the rake for operating the same.

8. A rake mechanism for mowing-machines comprising a supplemental hub, means for securing said hub centrally to the side of a transporting-wheel of the machine, a bevel-gear secured on said hub, a frame mounted on said hub, means for preventing the frame from rotating therewith, a bevel-gear carried by said frame at right angles to the bevel-gear on the hub and meshing therewith, a rake, and a shaft mounted in the frame and driven by said bevel-gears for operating the rake.

9. A detachable raking mechanism for grass-cutting machines comprising a bevel-gear, means for securing said gear at the end of the axle of the machine, a frame extending upwardly from said means, a rigid support for said frame, a shaft mounted in said frame, a bevel-gear thereon engaging the first-mentioned gear, a rake-bar pivoted on said shaft, a track controlling the movement of said bar, and rake-teeth attached to said bar.

10. A detachable raking mechanism for grass-cutting machines comprising a bevel-gear, means for securing said gear at the end of the axle of the machine, a frame extending upwardly from said means, a rigid support for said frame, a shaft mounted in said frame, a bevel-gear thereon, engaging the first-mentioned gear, a rake-bar pivoted to said shaft, a track controlling the movement of said bar, rake-teeth attached to said bar, and a clutch on said shaft for throwing the rake-actuating means into or out of operation.

11. A detachable raking mechanism for grass-cutting machines comprising a bevel-gear, means for securing said gear at the end of the axle of the machine, a frame extending upwardly from said means, a rigid support for said frame, a shaft mounted in said frame, a bevel-gear thereon engaging the first-mentioned gear, a rake-bar pivoted on said shaft, a track controlling the movement of said bar, rake-teeth attached to said bar, a clutch on said shaft for throwing the rake-actuating means into or out of operation, and means for moving said clutch for disengaging it from the rake-actuating means.

12. A detachable raking mechanism for grass-cutting machines comprising a bevel-gear, means for securing said bevel-gear at the end of the axle of the machine, a bearing-frame extending upwardly from said means, a rigid support for said frame, a shaft mounted in said frame, a bevel-gear thereon engaging the first gear, a rake-bar pivoted on said shaft, a track controlling the movement of said bar, rake-teeth attached to said bar, a clutch on said shaft for throwing the rake-actuating means into or out of operation, and a member connected with said clutch for disengaging it from the rake-actuating means.

13. A detachable raking mechanism for grass-cutting machines comprising a bevel-gear, means for securing said bevel-gear at the end of the axle of the machine, a frame extending upwardly from said means, a rigid support for said frame, a shaft mounted in said frame, a bevel-gear thereon engaging the first gear, a rake-bar pivoted on said shaft, a track controlling the movement of said bar, rake-teeth attached to said bar, a clutch on said shaft for throwing the rake-actuating means into or out of operation, and means for moving said clutch that is controlled by the operator and for disengaging said clutch.

In witness whereof I have hereunto set my hand and seal, at Kokomo, Indiana, this 27th day of May, A. D. 1902.

NELSON G. HANNA. [L. S.]

Witnesses:
THOMAS S. GERHART,
JOHN W. COOPER.